United States Patent

Hall

[15] 3,693,909
[45] Sept. 26, 1972

[54] GUIDED MISSILE TRAJECTORY ALIGNMENT METHOD

[72] Inventor: James R. Hall, St. Charles, Mo.

[73] Assignee: The United States of America as represented by the Secretary of the United States Air Force

[22] Filed: Feb. 18, 1970

[21] Appl. No.: 14,825

[52] U.S. Cl............................................244/3.2
[51] Int. Cl. .........F41g 7/00, F41g 9/00, F41g 11/00
[58] Field of Search......................................244/3.2

[56] References Cited

UNITED STATES PATENTS

| | | | |
|---|---|---|---|
| 3,188,019 | 6/1965 | Boutin | 244/3.2 |
| 3,231,726 | 1/1966 | Williamson | 244/3.2 X |
| 3,451,643 | 6/1969 | Sargent et al. | 244/3.2 |

*Primary Examiner*—Benjamin A. Borchelt
*Assistant Examiner*—Thomas H. Webb
*Attorney*—Harry A. Herbert, Jr. and Willard R. Matthews, Jr.

[57] ABSTRACT

Method aligning a guided missile with its velocity vector at the beginning of post exoatmospheric flight. This missile velocity vector data is established during preexoatmospheric flight. At re-entry, the outputs of normal and axial accelerometers and the missile velocity vector data are used to determine the difference angle existing between the missile's major longitudinal axis and the missile velocity vector. When the difference angle is less than 0.5° pitch and yaw integration functions are initiated. The integration functions are based upon a value of roll attitude that makes the pitch angle equal to 0 and the yaw angle equal to the difference angle. System roll attitude data is then used to transform the reference to a frame in which the local horizontal frame is known.

1 Claim, 4 Drawing Figures

INVENTOR.
JAMES R. HALL

GUIDED MISSILE TRAJECTORY ALIGNMENT METHOD

BACKGROUND OF THE INVENTION

This invention relates to inertial guidance systems for missiles and in particular to a new and improved method for accomplishing missile trajectory alignment following re-entry into the sensible atmosphere.

Inertial guidance systems in general can be divided into two classes: stable platforms systems and so-called strapdown systems. Stable platform systems are used most often for long range applications and when higher degrees of accuracy are required. These systems maintain pitch and yaw attitude data throughout the entire missile flight. They are much more sophisticated, heavier and more costly than strapdown systems. They have been preferred over strapdown systems for long range application because the pitch and yaw attitude reference drift errors that occur during exoatmospheric flight in strapdown systems render then highly inaccurate. The elimination of pitch and yaw attitude reference drift errors would give strapdown systems performance characteristics that are comparable to stable platform systems. It would thus be possible to take advantage of the inherent simplicity, hardness and small size of strapdown systems without sacrificing required accuracy and reliability. The present invention is directed toward achieving this and other ends.

SUMMARY OF THE INVENTION

The essence of the present invention is a technique that permits missile trajectory alignment following exoatmospheric flight. It thus allows establishment of the pitch and yaw attitude references during the initial phase of reentry rather than the latter phase of ascent. This eliminates the yaw and pitch attitude drift errors which occur during exoatmospheric flight.

The method of the invention can advantageously be applied to missiles employing strapdown inertial guidance systems. It can also be used to significantly simplify stable platform guidance systems. It comprehends the use of inertial guidance systems that include special purpose digital computers, inertial sensor devices; roll attitude reference devices and other conventional inertial guidance system building blocks. Implementation of the method of the invention begins with the establishment of the missile's velocity vector data prior to entering exoatmospheric flight. After reentry into sensible atmosphere, normal and axial inertial information is derived and calculated with the recorded velocity vector information to determine the angle at which the longitudinal axis of the missile differs from the velocity vector. When the angle is sufficiently small, pitch and yaw integration functions are initiated using an assumed missile roll attitude that puts the difference angle in the yaw plane. Subsequent adjustment to a known frame of reference is accomplished by reference to system roll attitude reference information.

It is a principle object of the invention to provide means for achieving a new and improved inertial guidance system having post exoatmospheric missile trajectory alignment capabilities.

It is another object of the invention to provide means for achieving an inertial guidance system of the so-called strapdown type that has range and accuracy capabilities that are comparable to the capabilities of stable platform guidance systems.

It is another object of the invention to provide in a strap down inertial guidance system a method of eliminating the pitch and yaw attitude reference drift errors that may occur during exatmospheric flight.

These, together with other objects, features and advantages of the invention will become more apparent from the following detailed description taken in conjunction with the accompanying drawings.

DESCRIPTION OF PREFERRED EMBODIMENT

Figure 1:
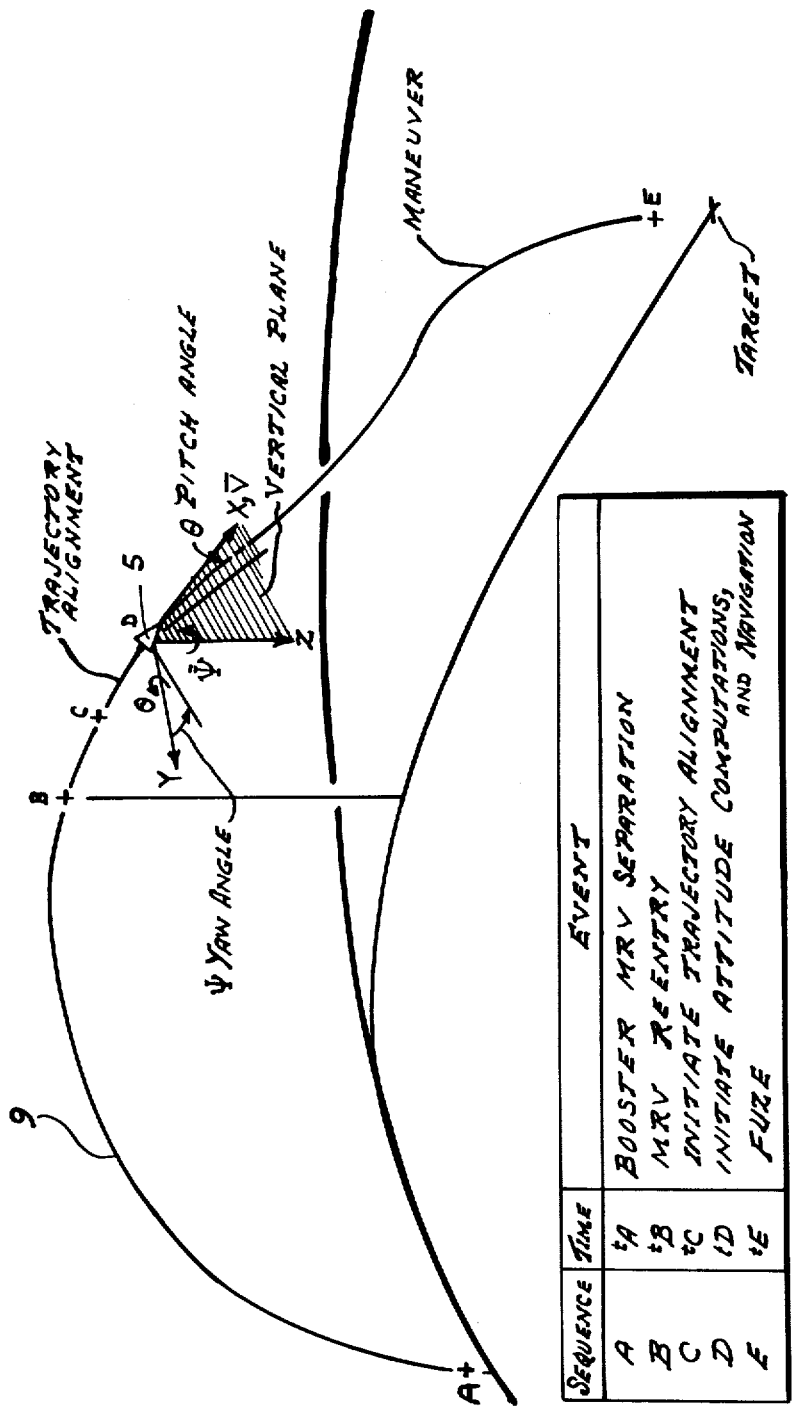
FIG. 1 illustrates the flight path and sequence of events of an inertially guided missile of the type comprehended by the invention.

Referring now to FIG. 1 there is illustrated thereby the flight path 9 of a missile 5 which represents the type of guided ballistic missile and operation thereof to which the present invention applies. Missile coordinates $x$, $y$ and $z$ are illustrated to show yaw and pitch displacements. Flight sequence of such a missile flight calls for booster separation to take place at A, reentry at B, initiation of trajectory alignment at C, initiation of attitude computations and navigation at D and fuzing at E.

Figure 2:
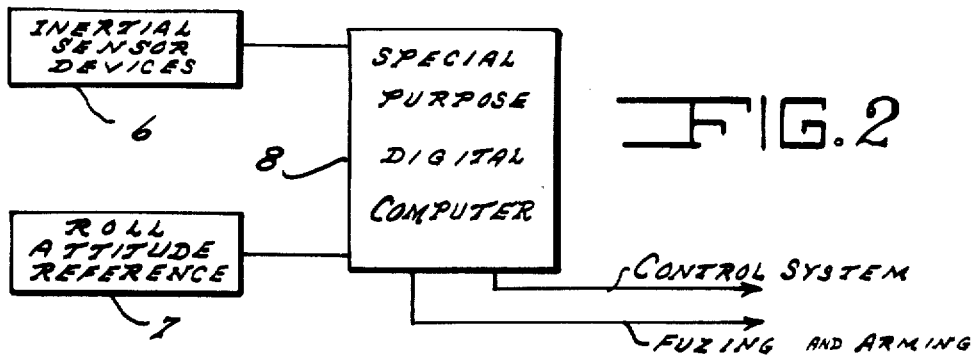
FIG. 2 is a block diagram of the basic functional portions of an inertial guidance system of the type comprehended by the invention.

The essential elements of an inertial guidance system capable of controlling such a missile are illustrated by the block diagram of FIG. 2. Special purpose digital computer 8 performs the functions of trajectory alignment, attitude reference maintanence, control, fuzing and navigation. It is supplied with data inputs from inertial sensor devices 6 which detect three axes acceleration information and three axes angular rate information and from roll attitude reference 7. The computer outputs are control commands to the vehicle control system and actuating signals to the fuzing and arming equipment. Such a system, of course, includes various other sensing and actuating means not shown.

Figure 3:
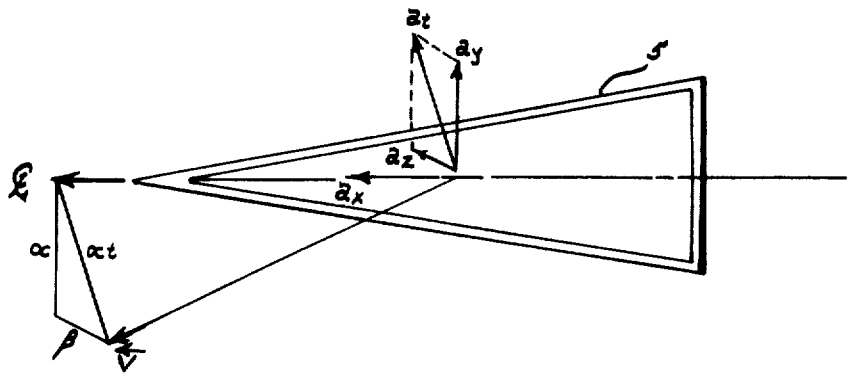
FIG. 3 illustrates the velocity vector, angle of attack and center line relationships of a typical guided missile.

The trajectory alignment technique of the present invention performs the function of establishing the pitch and yaw attitude of a missile with respect to the velocity vector during the initial phase of atmospheric reentry. The vehicle must be symmetrical and dynamically stable about its longitudinal axis. The alignment problem is one of initiating the integrations, $$\theta = \int_0^t \dot\theta dt, \quad \psi = \int_0^t \dot\psi dt$$

or similar integrations at a time when the pitch and yaw angles shown in FIG. 1 are equal to zero or are close to zero. This establishes an attitude reference from which navigation guidance and steering can be performed. The alignment process is now described with reference to FIG. 3. FIG. 3 illustrates missile 5 the center line of which coincides with its longitudinal axis. The velocity vector is represented by the vector designated V, normal accelerometer outputs are represented by vectors $a_x$ and $a_y$ and the axial accelerometer output is represented by vector $a_x$. $\alpha$ represents the angle of attack, $\beta$ the bank angle and $\alpha_t$ the total angle of attack.

The method of the invention is praticed as follows:

a. When the sensible atmosphere is reentered the total normal acceleration $a_t$ is computed from the normal accelerometer outputs (that is, $a_t = \sqrt{a_y^2 + a_x^2}$).

b. The total angle of attack $\alpha_t$ is then computed by ratioing the expressions for the normal acceleration and the total acceleration with stored velocity vector information in accordance with the equations $$\frac{\alpha_t C_{n\alpha} q S/W}{C_A q S/W} = \frac{a_t}{a_x} \rightarrow \alpha_t = \frac{C_A}{C_{N\alpha}} \frac{a_t}{a_x}$$

where the following definition applies $C_n$ is the normal force coefficient due to the angle $\alpha$
$C_A$ is the axial force coefficient
$q$ is the dynamic pressure, and
$S/W$ is the reference area divided by the weight of the vehicle The value of $(C_A/C_{N\alpha})$ is derived from a table stored in the computer with respect to time.

c. Strapdown function computations are initiated when the angle of attack $\alpha_t$ is equal to or less than 0.5° using the parameters $\phi$ (roll attitude) = 0
$\theta$ (pitch attitude) = 0
$\Psi$ (yaw attitude) = $\alpha = (C_A/C_{N\alpha})(a_t/a_x)$.

Figure 4:
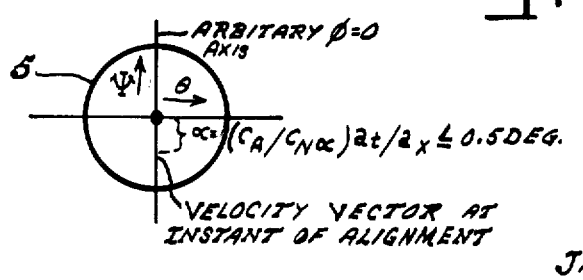
FIG. 4 is a nose on view of a guided missile.

FIG. 4 is a nose on view of the missile illustrating these relationships. The strapdown system is thus aligned to the velocity vector in pitch and yaw for an arbitrary roll ($\phi$) attitude.

d. Roll attitude data is used to transform the reference to a frame where the horizontal frame is known.

Trajectory alignment is used when a vehicle reenters the sensible atmosphere along a velocity vector which has been accurately established some time earlier, e.g., when the vehicle left the sensible atmosphere. FIG. 1 shows a typical application where trajectory alignment is being performed between points B and C. Alignment is initiated when the normal accelerations are sensible and stopped when the alignment uncertainty has been reduced below the mechanical alignment accuracy. Navigation is started immediately in order to eliminate variations in the vehicle and the atmosphere on error sources.

The use of trajectory alignment eliminates the need to maintain pitch and yaw attitude data throughout exoatmospheric flight. For a system using the stabilized platform to supply attitude data, this results in eliminating the need for the platform or at least reduces the stabilized platform to a single axis system. For strapdown attitude reference systems, the pitch and yaw computation drift errors occuring during exoatmospheric flight are no longer a factor in the alignment accuracy at re-entry.

It will be obvious that the general principles herein disclosed may be embodied in many other embodiments unlikely different from those illustrated without departing from the spirit and scope of the invention as defined in the following claim.

What is claimed is:

1. The method for a missile controlled by an inertial guidance system having a special purpose digital computer, inertial sensing devices and roll attitude reference and control devices of: aligning the longitudinal axis of the inertially guided missile with its velocity vector at re-entry comprising the steps of establishing and recording physical signals indicative of velocity vector data, during pre-exoatmospheric flight, commencing at re-entry of the guided missile to the sensible atmosphere to monitor from normal and axial inertial intelligence signals and from said recorded velocity vector intelligence signals the difference angle between the missile's longitudinal axis and its velocity vector, initiating intelligence signal processing for provision of signals corresponding to pitch and yaw integration functions when said difference angle is less than 0.5°, said integration functions signals being based on an arbitrary missile roll attitude that equates the missile's pitch angle to zero and its yaw angle to said difference angle, and adjusting the roll angle control means of said missile by utilization of signals corresponding to roll attitude intelligence signals measured subsequent to re-entry to achieve coincidence with actual physical condition.

* * * * *